INVENTOR:
Grant D. Bradshaw
By E J Andrews
Atty.

July 31, 1928.            G. D. BRADSHAW            1,678,844
FLUID SEPARATOR
Filed May 31, 1924            2 Sheets-Sheet 2
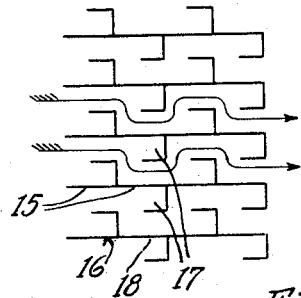
Fig. 3.
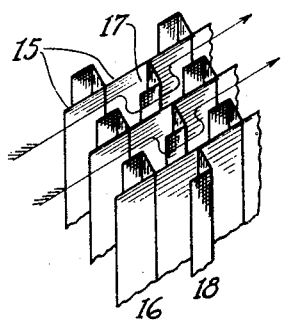
Fig. 4
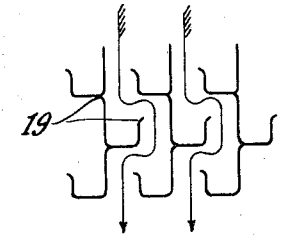
Fig. 5
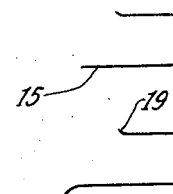
Fig. 7.
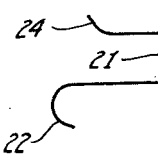
Fig. 8
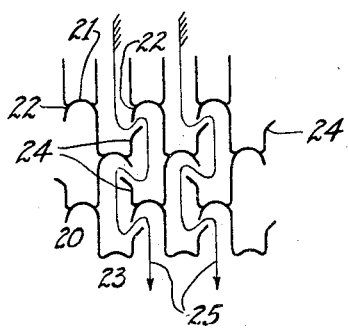
Fig. 6.
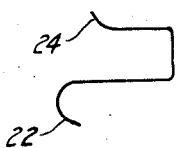
Fig. 9.
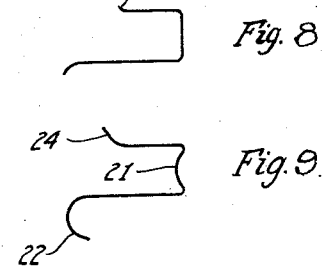
Fig. 10.
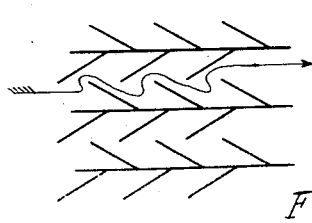
Fig. 9
Fig. 14
INVENTOR:
Grant D. Bradshaw
By E. J. Andrews
Atty.

Patented July 31, 1928.

1,678,844

UNITED STATES PATENT OFFICE.

GRANT D. BRADSHAW, OF PITTSBURGH, PENNSYLVANIA, ASSIGNOR, BY MESNE ASSIGNMENTS, TO BLAW-KNOX COMPANY, OF BLAWNOX, PENNSYLVANIA, A CORPORATION OF NEW JERSEY.

FLUID SEPARATOR.

Application filed May 31, 1924. Serial No. 716,915.

This invention relates to improvements in fluid separators and has for its object means for more perfectly separating the impurities, particularly liquids from various gases. The invention is directed towards eliminating all of the liquid from the gas such as oil vapor or steam, and it is an improvement on the steam separator illustrated and described in Patent No. 1,336,870, issued to H. H. Tracy, April 13, 1920, and for the details of the separator which are not material to the present invention reference may be had to said patent.

Figure 1:
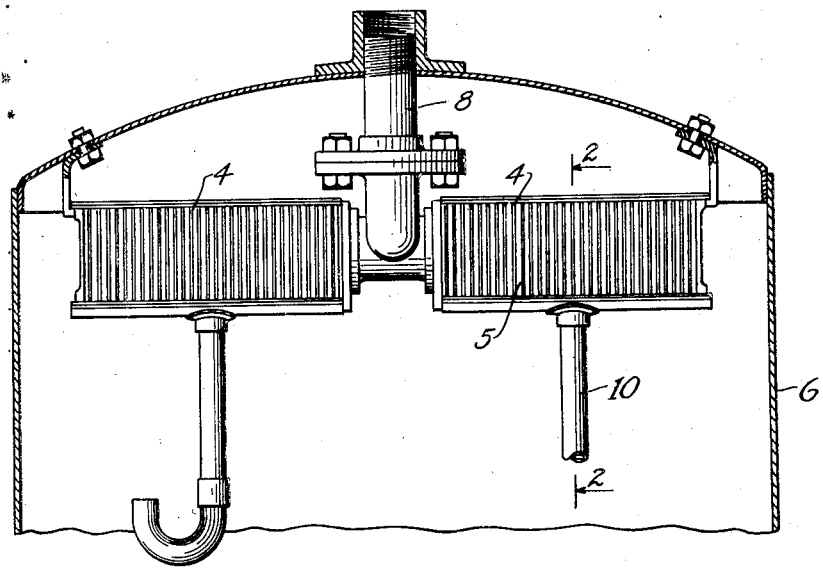
Figure 2:
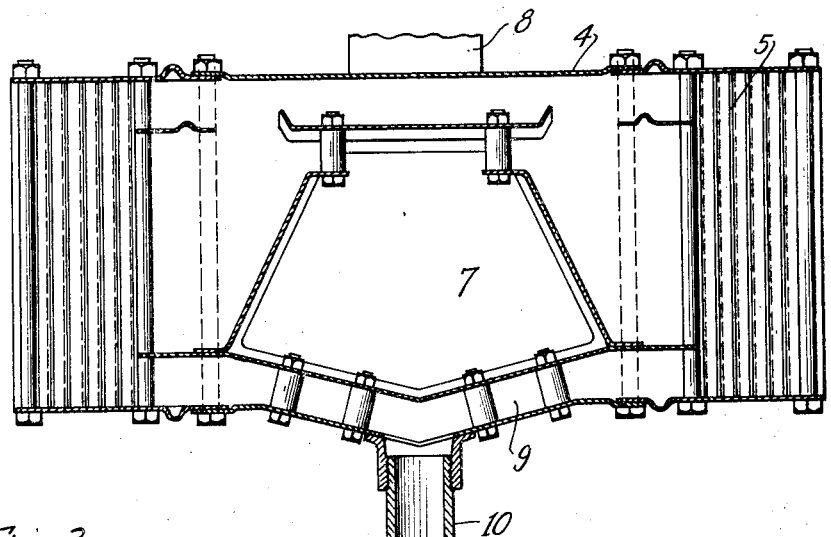

Of the accompanying drawings, Fig. 1 is an elevation of a separator such as is in common use; Fig. 2 is an enlarged transverse sectional view of one section of the separator along the line 2—2 of Fig. 1; Fig. 3 is a diagrammatic sectional view of baffles which embody the features of my invention; Fig. 4 is a perspective view of some of the baffles of Fig. 3; Figs. 5 and 6 are other modified forms and arrangements of baffles embodying the features of my invention; and Figs. 7 to 10 illustrate various forms of individual baffles.

In general the improvement which I have made applies merely to the arrangement and form of the baffles used in the separator, and the other portions of the separator may be similar to any ordinary type of separator, such as the one illustrated by Fig. 1. And although I have herein illustrated and described a separator such as is ordinarily used for separating moisture from steam, yet it is to be understood that the invention is equally applicable to the separation of impurities of various sorts from gases and vapors, and may be used in the fractional distillation of various gases such as benzene, gasolene, and the like.

The separator described herein comprises two casings 4 in the sides of which are mounted systems of baffles 5. The separator when in use is ordinarily mounted within a boiler 6, when used for purifying steam, and the steam passes through the baffles 5, into the interior chamber 7 of the separator, and then, ordinarily, the steam passes through an outlet 8 out of the boiler and into the steam main of the system. As the steam passes through the baffles, the moisture therein is stopped in its flow by the baffles and it runs downwardly into a passageway 9, and thence through a pipe 10 and back into the boiler or out of the boiler to any point to which it is desired to discharge this liquid. Suitable partitions or baffles are provided in the casing for preventing the steam from coming in contact with the liquid after it is passed through the baffles and for other well-known purposes.

With separators as the baffles are ordinarily arranged, it is common for two streams of gas to meet at various points as they pass through the baffles. Such opposing streams provide ideal atomizers, and the particles of moisture entrained in the gas are thus broken up into small particles or individual molecules.

One objection of my invention, therefore, is to eliminate these opposing streams and at the same time to so direct the streams of gas as to drive the moisture into the dead pockets as is ordinarily the case. This I accomplish by forming the baffles with one side 15 long enough to reach to the adjacent row of baffles so that the stream of gas, when it makes the turn between the rows of baffles, all flows in one direction and no opposing streams are formed, as indicated by the arrows in Figs. 3 and 4. Fig. 7 shows the shape of an individual baffle of this type. By this arrangement the head-on collisions are entirely avoided, yet the gas flows from the first row of baffles 16 against the dead pockets 17 of the baffles in the row 18; so that this effect is similar to that of the ordinary arrangement, as the moisture passes onwardly into the pocket and adheres to the walls thereof. But the gas all turns in one direction. As a consequence the head-on collisions are entirely prevented and an opportunity is given for the moisture to drive against the walls of the baffles as the gas makes the turn.

The atomizing tendency of the moisture in the gas is increased not only by the impacts of the particles against each other or against surfaces, but also by increase in speed of the particles when the impact occurs. It, therefore, becomes desirable not only to eliminate impacts as much as possible, but also to keep the speed down below a practical maximum. When the two streams of gas meet, the atomizing effect is equivalent to the impact of a single stream at twice the speed. Hence by eliminating these opposing streams, the speed of the gas may be substantially doubled without increasing the atomizing tendency, and the capacity of the separator may be increased accordingly. Also by eliminating opposing streams and substituting effective turns in the streams of gas, I am able to double the number of effective turns, because, as will be understood, the turns which are caused by the opposing streams are not effective in separating moisture. My arrangement, therefore, which allows a material increase in speed, and hence allows more gas to pass through in a given time, provides greater capacity so that the length of the separators or the numbers of sections may be reduced; and as the effective number of turns is doubled the number of rows may be decreased, without decreasing the purifying effect of the separators.

In Fig. 5, a modified shape of baffles is illustrated. An individual baffle of this type is illustrated by Fig. 8. In this case the outer edges 19 of the U-shaped baffles are turned outward slightly. The longer side is turned out in order to be sure of obtaining a smooth surface and not a shoulder where the edge of the side abuts against the bottoms of the preceding row of baffles, thus interfering less with the flow of the gas and giving a better opportunity for the moisture to be thrown against the surface. The edges of the short legs of the baffles are turned out slightly in order to insure a greater bend of the stream. In the arrangement shown in Fig. 3, instead of making 90° turns in passing from one row of baffles to the next, the bends might be considerably less than 90°; but with the edges curved somewhat as indicated in Fig. 5 fully 90° would be obtained in case of both turns.

In Fig. 6 I have illustrated a further modification in which the walls of the baffles are so formed as to cause the streams of gas to bend materially more in passing through. Fig. 9 shows the shape of an individual baffle of this type. The first rows of baffles have convex inner walls or bottoms 21 into which project similarly curved walls 22 of the baffles of the next row. And the short legs 24 of the baffles are curved outwardly somewhat similar to the short legs of the baffles illustrated by Fig. 5. As a consequence the gas takes a path somewhat as indicated by the arrows 25 and by this arrangement the number of effective bends of the streams of gas is not only doubled, but these bends are materially more than 90°; theoretically, in fact, each being 180°. So that in passing from one row of baffles to the next, there are substantially four bends and hence the separating effect with the same number of rows of baffles is substantially four times as great. But it is desirable to have the long walls 15 form straight continuous surfaces; and to have the curved long walls of the baffles of Fig. 6 abut against the bottoms of the adjacent baffles so as to prevent flow of gas between the two baffles.

I claim as my invention:

1. In a gas purifying apparatus a plurality of baffles the transverse sections of which are U-shaped, the baffles being spaced apart and arranged in rows, the baffles of one row being staggered with reference to those of the adjacent rows, and the outer edge of one side of each baffle substantially abutting against a baffle in the preceding row.

2. In a gas purifying apparatus a plurality of baffles the transverse sections of which are U-shaped, the baffles being spaced apart and arranged in rows, the baffles of one row being staggered with reference to those of the adjacent rows, and the outer edge of one side of each baffle substantially abutting against a baffle in the preceding row, the said edge being bent outwardly.

3. In a gas purifying apparatus a plurality of baffles the transverse sections of which are U-shaped, the baffles being spaced apart and arranged in rows, the baffles of one row being staggered with reference to those of the adjacent rows, and the outer edge of one side of each baffle substantially abutting against a baffle in the preceding row, the said edge being bent outwardly, and the shorter side also having its outer edge bent outwardly.

4. In a gas purifying apparatus a plurality of baffles the transverse sections of which are U-shaped, the baffles being spaced apart and arranged in rows, the baffles of one row being staggered with reference to those of the adjacent rows, and the outer edge of one side of each baffle substantially abutting against a baffle in the preceding row, the said edge being bent outwardly, and extending substantially across the bottom of the preceding baffle.

5. In a gas purifying apparatus a plurality of baffles the transverse sections of which are U-shaped, the baffles being spaced apart and arranged in rows, the baffles of one row being staggered with reference to those of the adjacent rows, and the outer edge of one side of each baffle substantially abutting against a baffle in the preceding row, the said edge being bent outwardly, and extending substantially across the bottom of the preceding baffle, and the outer edge being curved away from the preceding baffle.

6. In a gas purifying apparatus a plurality of trough-shaped baffles arranged in rows, the baffles in one row being staggered with reference to the baffles in the adjacent rows, the outer surface of each of the bottoms of the baffles being concave, and one side of the adjacent baffle in the following row being curved substantially to conform to and abutting against said concave surface.

7. In a gas purifying apparatus a plurality of troughs arranged in rows, the troughs in one row being staggered with reference to those in the adjacent rows, the outer surface of each of the bottoms of the troughs being concave, and one side of the adjacent troughs in the following row being curved substantially to conform to and abutting against said concave surface, the other side of each trough being materially shorter than the said curved side.

8. In a gas purifying apparatus a plurality of trough shaped baffles arranged in rows, the baffles in one row being staggered with reference to the baffles in the adjacent rows, the outer surface of each of the bottoms of the baffles being concave, and one side of the adjacent baffle in the following row being curved substantially to conform to and abutting against said concave surface, the other side of each baffle being materially shorter than the said curved side, but being also curved outwardly.

9. In a gas purifying apparatus a plurality of baffles the transverse sections of which are trough-shaped, the baffles being spaced apart and arranged in rows, the baffles of one row being staggered with reference to those of the adjacent rows, and the outer edge of one side of each baffle substantially abutting against a baffle in the preceding row.

10. In a gas purifying apparatus a plurality of baffles the transverse sections of which are trough-shaped, the baffles being spaced apart and arranged in rows, the baffles of one row being staggered with reference to those of the adjacent rows, and the outer edge of one side of each baffle substantially abutting against a baffle in the preceding row, the abutting sides thus forming a continuous wall.

11. In a gas purifying apparatus a plurality of baffles having sides, the baffles being arranged in rows, with the baffles of one row staggered with reference to those of the adjacent rows, and one of the sides of each of the baffles in one row substantially abutting against a baffle bottom in the preceding row, the abutting side of each of the baffles in one row being the side of the baffles opposite to the abutting side of each of the baffles in the adjacent rows.

12. In a gas purifying apparatus a plurality of baffles the transverse sections of which are U shaped, the baffles being spaced apart and arranged in rows, the baffles of one row being staggered with reference to those of the adjacent rows, and the outer edge of one side of each baffle substantially abutting against a baffle in the preceding row, and the outer edge of the other side being materially bent.

13. In a gas purifying apparatus a plurality of baffles the transverse sections of which are U-shaped, the baffles being spaced apart and arranged in rows, the baffles of one row being staggered with reference to those of the adjacent rows, and the outer edge of one side of each baffle substantially abutting against a baffle in the preceding row, both of the outer edges of each baffle being materially bent.

In testimony whereof, I hereunto set my hand.

GRANT D. BRADSHAW.